United States Patent [19]
Cockerill et al.

[11] 4,057,846
[45] Nov. 8, 1977

[54] BUS STEERING STRUCTURE FOR LOW COST PIPELINED PROCESSOR SYSTEM

[75] Inventors: William Clyde Cockerill; Louis Michael Hornung; Donavon William Johnson; Richard Alan Vrba, all of Austin, Tex.

[73] Assignee: International Business Machines Corporation, Armonk, N.Y.

[21] Appl. No.: 693,821

[22] Filed: June 7, 1976

[51] Int. Cl.² ............................................. G06F 3/00
[52] U.S. Cl. .................................................. 364/200
[58] Field of Search ..................... 445/1; 340/172.5; 364/200

[56] References Cited
U.S. PATENT DOCUMENTS 3,416,139  12/1968  Marx ................................. 340/172.5
4,016,546  4/1977  Bennett et al. ......................... 364/200

Primary Examiner—Harvey E. Springborn
Attorney, Agent, or Firm—John W. Henderson, Jr.

[57] ABSTRACT

Logic circuitry is provided for controlling the transfer of data between 1) a low cost pipelined processor and its associated memory, 2) between the processor and input/output devices, and 3) between the input/output devices and memory. A plurality of unidirectional busses are provided to interface the processor and memory and a bidirectional buss is provided to interface with the input/output devices. The logic circuitry provides a control function to steer data over the proper buss structures interconnecting the processor, the memory and the input/output devices and provides those interconnections in a manner which allows the processor to overlap input and output functions.

7 Claims, 3 Drawing Figures

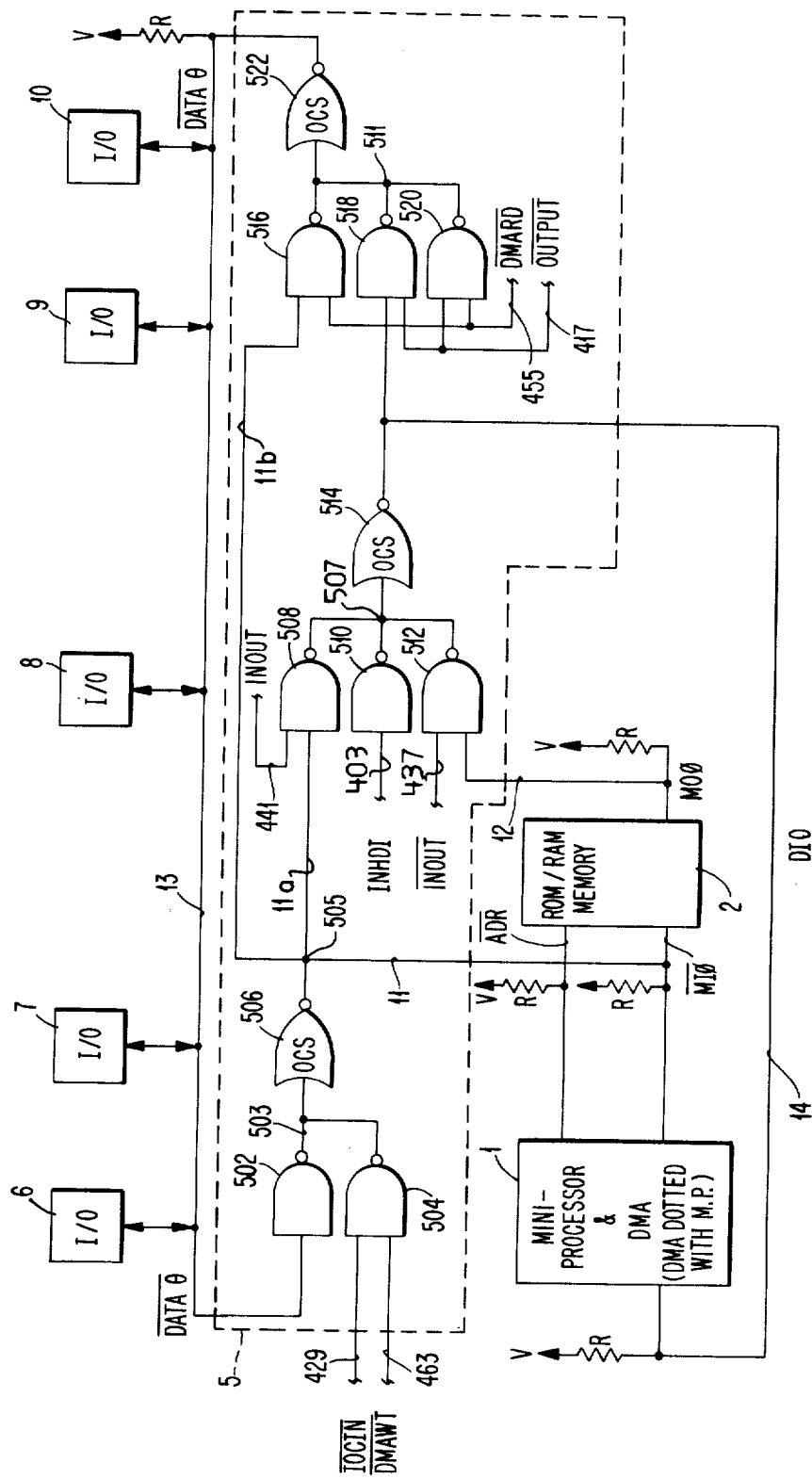

BUS STEERING STRUCTURE FOR LOW COST PIPELINED PROCESSOR SYSTEM

BACKGROUND OF THE INVENTION

1. Field of the Invention

The present invention relates to logic for controlling the transmission of data signals between a processor and its associated memory and input/output devices.

2. Prior Art

Through the utilization of LSI MOS technology the size and cost of processors have decreased manyfold. Accordingly it has become possible to construct an entire processor on a single LSI MOS chip. However, these devices suffer from the disadvantage of having a high circuit to pin ratio, meaning pins are at a premium. One method in the prior art sought to overcome this problem by using the same pins for input and output and using internal circuitry to switch the data between input and output buffers of the processor. With this arrangement the system is limited to performing input and output operations serially. That is, an input or output operation must be completed before the next input or output can take place. This degrades processor performance because the speed of operation of the processor is limited by the speed of the input and output device.

LSI MOS technology has also led to dramatic size and cost reductions in memory. In using this technology for memory application, there is a critical tradeoff between cost and speed of application. The faster the memory operates the larger the electronic devices with which the memory must be built — hence the more expensive the memory. One of the key parameters by which the speed of the memory is measured is called access time. Access time is the time from which the memory is initially commanded to read the data at a certain address to which that data is availale from the memory. Typically in the prior art the address from which data is to be read, the reading of that data, and the transfer of the data into a register in the processor all take place within a period of time caled a machine cycle. Only after all of this has been accomplished can the address for the next read (or write) be specified to the memory and the next machine cycle commenced. The memory access time is, consequently, very critical to determining the speed with which the processor operates.

OBJECTS OF THE INVENTION

Accordingly, it is an object of the present invention to minimize the number of pins required by using a bidirectional I/O channel.

It is a further object of the present invention to maintain the data stream to and from a pipelined processor so as to operate efficiently while utilizing relatively slow memories (as measured by access time) and input/output devices.

It is another object of the present invention to eliminate the need for electrical or logical buffering of the input and output data streams at each of the I/O devices on the bidirectional I/O channel.

SUMMARY OF THE INVENTION

These and other objects are accomplished by providing control circuitry which selectively steers processor inputs and outputs between the memory data buss and the I/O data buss. The system includes unidirectional data busses for communication between the processor and the memory and a bidirectional data buss for communication with the plurality of I/O devices. The steering control circuit includes a decoder and gate. The gate is constructed of circuitry which provides a set of common electrical buffering for all the devices attached to the bidirectional I/O channel. Electrical buffering consists of a power up function to interface the low drive current FET I/O devices to the higher drive currents of faster bipolar channels which interface between the processor and the memory. The decoder receives signals from the processor and controls the gate to steer the transmitted data onto the proper buss for transmission to the appropriate device. By selectively steering the data, processor inputs can be overlapped with output operations enhancing the operation of the processor in a pipelined mode.

The bussing structure of the present invention allows the address for the next memory cycle, and the data of this next cycle, where the cycle is a write into memory, to be emitted from the processor to the memory before the data read from the memory on the previous cycle has been transferred to the processor. Using this technique the speed of the processor is greatly enhanced without bearing the cost usually attendant to a corresponding increase in the memory speed. Obviously data can not be utilized in the processor until after the data has been transferred to the processor. Consequently, this aspect of the invention is usable with processors which are designed to tolerate this delay between the specification of the memory address and the entering of the data at that address into the processor. Processors with this capability are described herein as "pipelined processors." Pipelined processors are well known in the prior art. For example, one type of pipeline system was discussed in the article entitled "Circuit Implementation of High-Speed Pipelined Systems" by L. W. Cotten which was published in the proceedings of the Fall Joint Computer Conference, 1965, at page 489. Another article relating to the pipeline systems is entitled "The IBM System 360 Model 91: Floating Point Execution Unit", which was published in January, 1967 in the IBM Journal of Research and Development, Vol. 11, No. 1, page 34. Additionally, an application of pipelined processors to plural instruction streams is disclosed in U.S. Pat. No. 3,728,692, issued Apr. 17, 1973 to J. W. Fennell, Jr. and assigned to the same assignee as the present application.

Performance degradation is minimized while at the same time saving pins in critical areas by using unidirectional busses in combination with bidirectional busses. In a typical system, most of the pins are consumed by the I/O adapters. Most of the data transfers, however, are between the processor and the memory. Accordingly, using a bidirectional buss at the I/O adapters and unidirectional busses at the processor and memory constitutes an excellent cost/performance design point.

BRIEF DESCRIPTION OF THE DRAWINGS

FIG. 3 is an overall system diagram including a detailed implementation of the gate logic of FIG. 2.

DESCRIPTION OF THE PREFERRED EMBODIMENT

Figure 1:
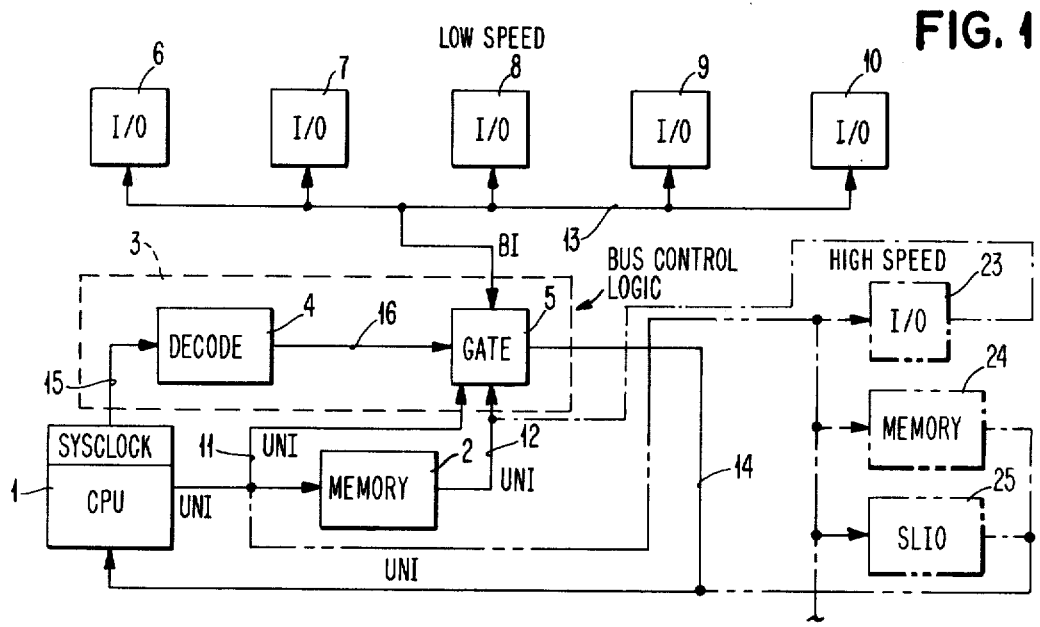
FIG. 1 is a block diagram of a data processing system including data steering logic of the present invention.

FIG. 1 is a block diagram of a data processing system which includes the data steering logic of the present invention. The system includes a CPU 1 whose output is connected to data bus 11 and whose input is connected to data buss 14. The CPU 1 contains a processor and a direct memory access controller (DMA) for transferring data between the memory and I/O device between processor cycles. Both data buss 11 and data buss 14 are preferable unidirectional data busses, meaning data will travel in only one direction on the buss. The CPU 1 also is connected to decode 4 of buss control logic 3 through control signal line 15. Control signal line 15 carries coded timing and control data to buss control logic 3 from the system clock and the CPU 1. Data buss 11 is connected to the input of memory 2 and carries data signals from the CPU to memory 2. Data buss 11 is also connected to the input of gate 5 and carries output data signals from the CPU 1 to gate 5.

The output of memory 2 is connected to unidirectional data buss 12 which carries data from memory 2 into gate 5. Gate 5 is connected to decode 4 through signal line 16 and receives control signals from decode 4 causing gate 5 to select buss 14 or buss 13.

Buss 13 is a bidirectional buss which communicates with low speed I/O devices 6–10 and buss 14 is a unidirectional buss connected to the input of CPU 1. Low speed I/O devices 6–10 are devices which operate at speeds relatively slower than the CPU and memory cycles. Examples of these types of devices are line printers, magnetic or paper tape drives, disk drives, card readers, keyboards, etc. Devices of this type are widely known in the prior art and are readily available as off-the-shelf items from original equipment manufactures.

Figure 2:
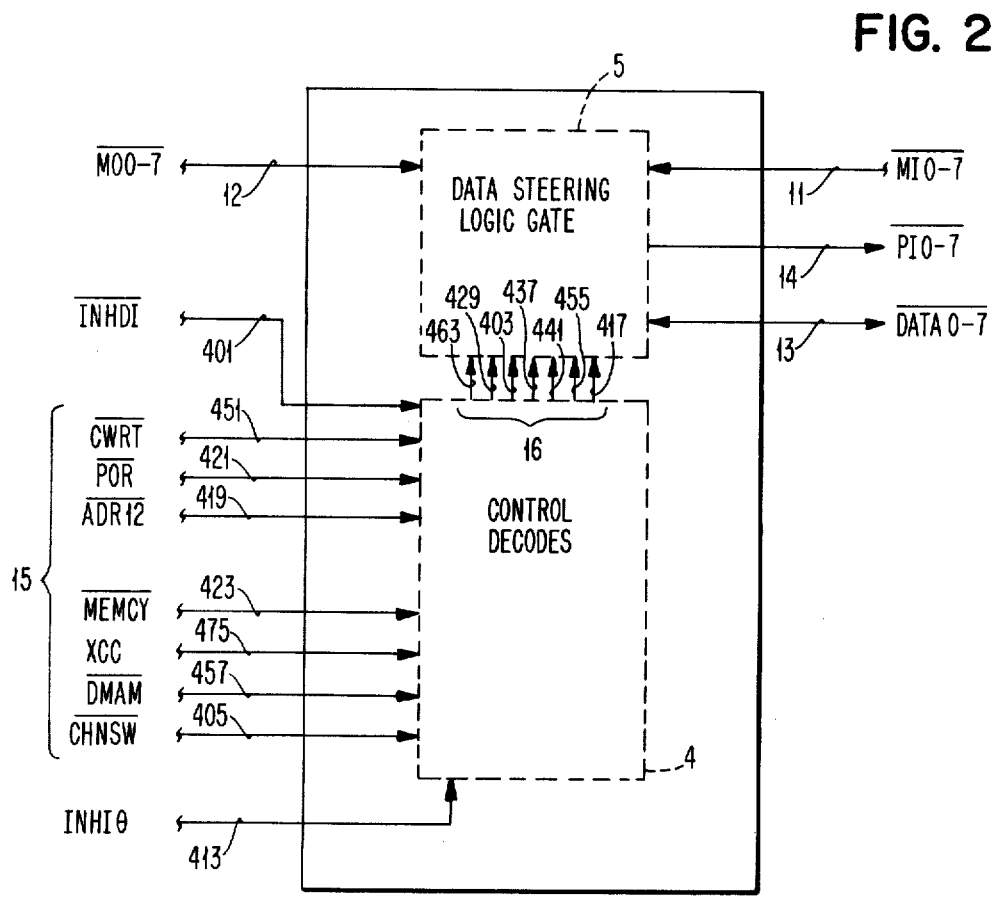
FIG. 2 is a functional block diagram of the data steering logic.

Referring now to FIG. 2, a more detailed drawing of decode 4 and gate 5 is shown. Decode 4 is connected to CPU 1 through control lines 15 and receives coded control signals from the CPU 1 which determine the configuration gate 5 will place the data busses in. The signals received by decode 4 includes $\overline{\text{CWRT}}$ 451 which determines whether or not the operation is a processor write, $\overline{\text{POR}}$ 421 which determines whether or not the operation is a power on "reset", $\overline{\text{ADR12}}$ 419 which indicates the address cycle of the operation, $\overline{\text{MEMCY}}$ 423 which indicates whether or not the operation is a memory cycle operation initiated by the processor or direct memory access controller, $\overline{\text{DMAM}}$ 457 which samples the request line of the direct memory access controller and determines whether or not the operation is to be a direct memory access (or cycle steal) operation, and XCC 475 and $\overline{\text{CHNSW}}$ 405 which provide the timing signals for the operation. XCC defines the beginning of a cycle and corresponds with th processor's phase one. $\overline{\text{CHNSW}}$ defines the time that the data in buss (DI$\phi$) 14 should be switched during the processor's phase two. Two other inputs, $\overline{\text{INHDI}}$ 401 and $\overline{\text{INHIO}}$ 413 provide test signals which can be used to override the decode and gating functions during testing of the module. The Direct Memory Access Controller (DMA), shown in FIG. 3, is dotted with, i.e., connected in parallel with the processor to perform direct transfers of data between memory and the I/O devices between cycles of operation of the processor. The DMA is connected to the processor input buss 14 and output buss 11 and operates in the overlapped mode. The combination of logical ones and zeros on control line 15 is decoded by the control decode 4 and the result outputted to gate 5 on line 16. If the operation requested by the CPU is an output to one of the I/O devices 6–10 then gate 5 will connect data buss 11 to data buss 13 enabling data to be transferred from the CPU to the selected one of the I/O devices 6–10. If the requested operation is an input to the CPU 1 from I/O devices 6–10, the gate 5 will connect data buss 13 to data buss 14 for transfer of data to the CPU 1. If the operation does not request one of the I/O devices 6–10, then the buss control logic 3 electrically isolates the relatively low speed I/O data buss 13 from the processor output data buss 11 and the processor input data buss 14. Processor data busses 11 and 14 are operated at high speeds which allow the processor to operate in the pipelined mode by overlapping input and output accesses to memory 2.

Referring to FIG. 1, I/O devices which operate at a speed comparable to memory 2 may be connected directly onto data busses 11 and 14 in parallel with memory 2 without degrading processor performance as shown by dashed box 23. Also other high speed memory devices may be connected to data busses 11 and 14 as shown by dashed box 24. Memory devices 24 must have their own gate logic analogous to gate logic 5. Dashed box 25 shows a second set of bus control logic called SLIO which is identical to bus control logic 3 and can be used to control data transfer to other low speed I/O devices physically located on other circuit cards.

The I/O devices 6–10 operate at comparably slower speeds than memory 2 and degrade system performance by preventing the overlapping of input and output. However, accesses to these devices require a relatively small amount of the processor time and overall system performance is greatly enhanced by isolating these slower devices from the system during high speed accesses.

High speed I/O devices which do not require a DMA type read and write function may be connected to either data buss 11 or data buss 14. In this configuration, the I/O devices are connected directly to the processor on buss 11 for output, and input to the processor from the devices takes place through gate 5 and data in buss 14. If the I/O device is connected directly to data in buss 14, then inputs to the processor from the device are performed directly, but outputs from the processor must pass through gate logic 5. More importantly, when connecting I/O devices directly to data in buss 14 provision must be made to prevent the I/O device from using the data buss 14 simultaneously with processor reads from memory 2. To prevent the I/O devices from destroying data being transferred from memory 2 to the processor, the I/O devices must be operated such that they do not start putting their data onto data buss 14 until the signal CHNSW is the logical 1. If these high speed I/O devices require both DMA read and write, they must connect to both data buss 11 and data buss 14.

Referring now to FIG. 3 a more detailed drawing of the gate logic 5 is shown. The outputs from the control decodes 4 are received by logic gate 5 over control line 16. These signals are $\overline{\text{OUTPUT}}$ 417 which defines whether the operation is an output from CPU 1, $\overline{\text{DMARD}}$ 455 and $\overline{\text{DMAWT}}$ 463 which define whether the operation is a direct memory access read or write to memory, INOUT 441 and $\overline{\text{INOUT}}$ 437 which define whether the operation is an I/O operation, INHDI 409 which defines whether the operation is a test, and IOCIN 429 which defines whether the operation is an input from I/O.

IOCIN 429 and DMAWT 463 are inputs to NAND gate 504. NAND gate 504 has its output connected to the output of NAND gate 502 and controls whether data on the bidirectional data buss 13 coming from the I/O units 6-10 is input to NOR gate 506. NOR gate 506 drives buss 11 which is connected to the input of memory 2 and also connected at node 505 with inputs 11a and 11b to gates which control buss 14 into the processor and buss 13 for output to the I/O devices on that buss. The input of NAND gate 508 is connected to output from NOR gate 506 by buss 11a. The operation of NAND gate 508 is controlled by signal INOUT on input line 441. NAND gate 508 controls the passage of data from the I/O devices 6-10 onto the buss 14 to the input of the processor 1. The output of NAND gate 508 is connected the outputs of NAND gates 510 and 512 at node 507. NAND gate 512 has its input connected to the output of memory 2 by data buss 12. NAND gate 512 is controlled by control signal INOUT on input line 437 to control the passage of data from the memory onto data buss 14 as input to the processor. The input to NAND gate 510 is control signal INHDI on line 403. INHDI can be used to inhibit the passage of data by either NAND gate 508 or NAND gate 512 during system testing. The outputs of NAND gates 508, 510 and 512 drive the input of NOR gate 514. NOR gate 514 is the buss driver for data buss 14 connected to the input of the CPU 1.

The output of NOR gate 506 is also connected to input of NAND gate 516 by buss 11b. This provides a path from buss 11 for earlier data output from the processor to the I/O devices on buss 13. This drives the input of NAND gate 516. Data buss 11b provides an alternative path for data being output from the processor on data buss 11 to an I/O device attached to I/O buss 13. This enables the processor 1 to overlap outputs to the I/O devices with processor reads from the memory 2 which take place through data busses 12 and 14. Thus, when a read from memory is initiated by the processor, the processor does not have to wait for the memory data transfer, but can continue operating and may overlap the output of data either to I/O devices connected to data buss 11 or data buss 13. The operation of NAND gate 516 is controlled by control signal DMARD on line 455. The output of NAND gate 516 drives NOR gate 522 and is connected to the outputs of NAND gates 518 and 520. NAND gate 518 has its input connected to the output of NOR gate 514 and controls the passage of data from the memory 2 to the I/O devices during the optional cycle steal operation. The operation of NAND gate 518 is controlled by control signal OUTPUT on line 417. NAND gate 520 is controlled by the control signals DMARD and OUTPUT and inhibits the passage of data to I/O buss driver 522 when the operation is an input of data to the processor from memory 2 or one of the I/O devices. NOR gate 522 is the buss driver from I/O buss 13.

The buss drivers 506, 514 and 522 are all open collector drivers. Therefore each data buss is provided with a pullup resistor R connected to a power source V.

OPERATION

Referring to FIGS. 2 and 3, assume that the CPU 1 requests a transfer of data from the memory 2 to the CPU 1. The processor and system clock output the following signals to control decode 4 on control buss 15: a logical zero for MEMCY on line 423 indicating that a memory cycle is requested, a logical one for DMAM on line 457 indicating that the operation is not a direct memory access, a logical one for CWRT one line 451 indicating that the operation is a processor read, a logical one for POR indicating that the operation is not a power on sequence, and logical ones for INHDI and INHIO indicating the operation is not a test. The remaining signals, ADR12 on line 419, CHNSW on line 405 and XCC on line 475 provide address and cycle timing information.

These signals are decoded by control decode logic 4 to provide the following gate control signals to logic gate 5 on control lines 16: a logical one for IOCIN on line 429 indicating that the operation is not an I/O input, a logical one for DMAWT on line 463 indicating that the operation is not a direct memory access write, a logical zero for INOUT and a logical one for INOUT indicating that the operation is not an I/O operation, a logical zero for INHDI on line 403 indicating that the operation is not a test, a logical one for DMARD on line 455 indicating that the operation is not a direct memory access read, and a logical one for OUTPUT indicating that the operation is not an output from the processor.

Data is output from the memory 2 onto memory out data buss MO$\phi$ 12 which drives NAND gate 512. The control signal INOUT to NAND gate 512 on line 437 is a logical one and controls NAND gate 512 to pass the data through output node 507 to the input of buss driver 514. Since INOUT on line 441 which controls NAND gate 508 and INHDI on line 403 which controls NAND gate 510 are both logical zeroes, no inhibit signal is provided at node 507 to prevent the transfer of data from gate 512 to buss driver 514. Buss driver 514 transfers the data onto data in buss DI$\phi$ 14 which is connected to the input of processor 1. The data is also input to NAND gate 518 which is connected to data buss 14. However, the combination of DMARD and OUTPUT inhibits the transfer of the data into buss driver 522 which controls the I/O data buss 13.

For a processor write into memory operation the gate logic decodes remain the same and the processor writes directly into memory 2 on data buss MI$\phi$.

For an output from the processor to a selected one of the I/O devices, the processor outputs the following control signals to control decode 4 on control buss 15: a logical one for MEMCY on line 423 indicating that the operation is not a memory cycle, a logical one for DMAM on line 457 indicating that the operation is not a direct memory access, a logical one for POR on line 421 indicating that the operation is not a power on sequence, and logical zero for CWRT on line 451 indicating that the operation is a write operation. The remaining signals remain the same as for processor read from memory.

These signals are decoded by control decodes 4 to provide the following control signals to logic 5 on control lines 16: a logical one for IOCIN on line 429 indicating the operation is not an I/O input, a logical one for DMAWT on line 463 indicating that the operation is not a direct memory access write into memory, a logical one for INOUT on line 441 and a logical zero for INOUT on line 437 indicating that the operation is an I/O operation, a logical zero for INHDI on line 403 indicating that the operation is not a test, a logical one for DMARD on line 455 indicating that the operation is not a direct memory access read and a logical zero for OUTPUT on line 417 indicating that the operation is a processor output.

The data is output from the processor onto data buss 11 into the data steering gate logic 5. Data buss 11 is connected at node 505 with the output of buss driver 506 and the inputs to NAND gates 508 and 516. The control signal for NAND gate 516 is $\overline{\text{DMARD}}$, a logical one, on line 455. $\overline{\text{DMARD}}$ controls NAND gate 516 to pass the data to buss driver 522. $\overline{\text{OUTPUT}}$ produces a logical zero at the outputs of both NAND gate 518 and 520 so as not to inhibit the passage of data from NAND gate 516 to buss driver 522. Buss driver 522 then places the data on I/O buss 13 to the selected I/O device.

For an input operation from I/O, the only change in the processor control outputs is $\overline{\text{CWRT}}$ on line 451 becomes a logical 1 indicating that the operation is not a processor write. This change is decoded by the control decode 4 to yield a change of state in $\overline{\text{OUTPUT}}$ on line 417 which becomes a logical one indicating that the operation is not an output and $\overline{\text{IOCIN}}$ on line 429 which becomes a logical zero indicating that the operation is an input from I/O. Input data is placed on the data buss 13 from the selected I/O device. $\overline{\text{IOCIN}}$ as a logical zero produces a logical one at the output of NAND gate 504 so as not to inhibit the passage of data through NAND gate 502 whose output is connected to the output of NAND gate 504. The output of NAND gate 502 drives buss driver 506 to drive the data into NAND gates 508 and 516. For high speed I/O devices connected to data buss 11, the data is placed on data buss 11 and input to NAND gates 508 and 516 over lines 11a and 11b respectively. Control signal INOUT on line 441 is a logical one and causes gate 508 to pass the data to buss driver 514. NAND gates 510 and 512 which are connected to NAND gate 508 at 507 do not inhibit the output from NAND gate 508 because INHDI and $\overline{\text{INOUT}}$ are at logical zero. Thus buss driver 514 drives the data onto data in buss DI$\phi$ 14 which is connected to the input of the processor.

Outputs from the processor to memory or I/O are overlapped with processor reads from memory 2. During the current cycle it sets up the memory address. The data is transferred during the second half of the current cycle or the first half of the next cycle. The processor outputs the address and data to the memory 2 which latches up the address in the well known manner. The output of the memory onto data buss 14 may be delayed up to one full processor cycle time. During this time the processor is free to input or output data to the I/O devices or access the memory again. If the next instruction is an output then the data is transferred onto data buss 11 to common node 505. The data is inhibited from passing through NAND gate 508 by control signal INOUT. This prevents the data from interfering with the transfer of data out of memory which must pass through common node 507. However, data buss 11b provides a bypass for the data into NAND gate 516. The output of NAND gate 516 is controlled by $\overline{\text{OUTPUT}}$ to pass the data into buss driver 522 as was previously described for the output operation. The data from memory 2 passes through memory out buss 12, gate 512, buss driver 514 and data in buss 14 as was previously described.

The buss control logic also controls the transfer of data during two special operations called Direct Memory Access Read (DMARD) and Direct Memory Access Write (DMAWT). The two operations are controlled by a direct memory access controller which is connect in parallel with the processor and shares the same power up circuits. The direct memory access controller executes a cycle steal operation between cycles of the processor and transfers data directly between the memory 2 and the I/O devices 6–10 or vice versa.

During direct memory access read from the memory 2 to a selected one of the I/O devices, the processor output signals remain the same as for a processor read but the DMA controller changes the state of $\overline{\text{DMAM}}$ to a logical zero indicating that the operation is a direct memory access. The change in state of the $\overline{\text{DMAM}}$ signal on line 457 causes the control decode 4 to change the state of $\overline{\text{DMARD}}$ on line 455 from logical one to logical zero indicating that the operation is a DMA read. Data output from memory 2 on data buss 12 then takes the same path, as previously discussed for a processor read, through NAND gate 512 and buss driver 514 onto data buss in 14. However, the change of state of $\overline{\text{DMARD}}$ on control line 455 causes the data to also pass through NAND gate 518 and into buss driver 522. Buss driver 522 then places the data on data buss 13 to the selected I/O device 6–10. Since the data also appears on data in buss 14, the operation can be a read of data into the DMA itself as well as to I/O.

Similarly for a DMA write into memory 2 from an I/O device the processor signals remain the same as for a processor write except $\overline{\text{DMAM}}$ on line 457 becomes a logical zero. This in turn causes the control decode to convert $\overline{\text{DMAWT}}$ from a logical one to a logical zero indicating that the operation is a direct memory access write into memory. The selected I/O device places data onto data buss 13 which activates NAND gate 502. The change of $\overline{\text{DMAWT}}$ on control line 463 removes the inhibition at node 503 and allows the output of NAND gate 502 to drive buss driver 506. Buss driver 506 then places the data onto data buss 11 for input into the memory 2 on memory in buss MI$\phi$. Note that for the DMA write function to be incorporated into the system, data buss 11 must be a bidirectional data buss. The DMA controller also can move data from one memory address to another as well as initiate the input of data to memory from I/O.

While the preferred embodiment of the invention has been described with reference to NAND and NOR logic gates it will be appreciated by those of skill in the art that the invention may be implemented using AND and OR gates or any other suitable combination without departing from the spirit and scope of Applicants' invention.

We claim:

1. In a word processing system including a CPU, a memory, and a plurality of I/O devices which operate at speeds slower than said CPU and said memory, apparatus for controlling the flow of information among said CPU, said memory, and said I/O devices comprising:
   a first unidirectional buss connected to the output of the CPU for transmitting information signals from the CPU;
   a second unidirectional buss connected to the output of said memory for transmitting information signals from said memory;
   a third unidirectional buss connected to the input of said CPU for transmitting information signals to said CPU;

a bidirectional buss connected to said I/O devices for transmitting information to and from said I/O devices;

decoding means connected to said CPU for decoding control signals from the CPU; and gating means responsive to said decoding means and connected to said first unidirectional buss, said second unidirectional buss, said third unidirectional buss, and said bidirectional buss for receiving information from said first and second unidirectional busses and said bidirectional buss and transferring the received information onto said third unidirectional buss or said bidirectional buss.

2. The apparatus of claim 1 wherein said first unidirectional buss is further connected to the input of said memory for transmitting information signals from said CPU to said memory.

3. The apparatus of claim 2 includes a means for transferring information from said CPU onto said first unidirectional buss to said memory is executed concurrently with a transfer of information by said gating means onto said third unidirectional buss to said CPU.

4. The apparatus of claim 2 includes a means for transferring information from said CPU onto said first unidirectional buss to said memory is executed concurrently with a transfer of information by said gating means onto said bidirectional buss to said I/O devices.

5. The apparatus of claim 2 includes a means for transferring information from said CPU onto said first unidirectional buss to said memory is executed concurrently with a transfer of information by said gating means from said bidirectional buss onto said third unidirectional buss to said CPU.

6. The apparatus of claim 2 wherein said gating means includes means for disconnecting said bidirectional buss from the remainder of the system during transfers of information from said CPU to said memory and transfers of information from said memory to said CPU.

7. The apparatus of claim 2 further including I/O devices which operate a speed comparable to said memory speeds and having an input connected to said first unidirectional buss for receiving information signals from said processor and an output connected to said second unidirectional buss for transmitting information signals to said gating means.

* * * * *

UNITED STATES PATENT OFFICE
CERTIFICATE OF CORRECTION

PATENT NO. : 4,057,846
DATED : November 8, 1977
INVENTOR(S) : William C. Cockerill, Lou Hornung, Donavon W. Johnson, Richard A. Vrba It is certified that error appears in the above-identified patent and that said Letters Patent are hereby corrected as shown below:

In Claim 3, line 20, delete "is executed".

In Claim 4, line 3, delete "is executed".

In Claim 5, line 8, delete "is executed".

Signed and Sealed this

Fourth Day of April 1978

[SEAL]

Attest:

RUTH C. MASON
Attesting Officer

LUTRELLE F. PARKER
Acting Commissioner of Patents and Trademarks